United States Patent [19]

Nedderman et al.

[11] Patent Number: 5,619,945
[45] Date of Patent: Apr. 15, 1997

[54] DRAG REDUCTION POLYMER EJECTION SYSTEM FOR UNDERWATER VEHICLE

[75] Inventors: William H. Nedderman, Middletown; Robert Meunier; Laurent C. Bissonnette, both of Portsmouth, all of R.I.

[73] Assignee: The United States of America as represented by the Secretary of the Navy, Washington, D.C.

[21] Appl. No.: 591,181

[22] Filed: Jan. 16, 1996

[51] Int. Cl.$^6$ .................................................. B63B 1/34
[52] U.S. Cl. .................................................. 114/67 A
[58] Field of Search ..................... 114/67 R, 67 A, 114/20.1

[56] References Cited

U.S. PATENT DOCUMENTS

| | | | |
|---|---|---|---|
| 3,286,674 | 11/1966 | Thompson et al. | 114/67 |
| 3,392,693 | 7/1968 | Hulsebos et al. | 114/20.1 |
| 4,090,458 | 5/1978 | Roberts | 114/20.1 |
| 4,186,679 | 2/1980 | Fabula et al. | 114/20.1 |
| 4,569,300 | 2/1986 | Ferris et al. | 114/67 R |

*Primary Examiner*—Sherman Basinger
*Attorney, Agent, or Firm*—Michael J. McGowan; Robert W. Gauthier; Prithvi C. Lall

[57] ABSTRACT

A boundary layer polymer reservoir has bladder type side walls and is supported in a chamber in a vehicle that can be filled with sea water under pressure to provide external forces on the reservoir to eject the polymer through ports in the nose of the vehicle. The vehicle is a buoyant test vehicle that is drawn downwardly to a depth that produces a predetermined pressure in the chamber. The reservoir is elliptical with a support ring to which the elliptical side walls are peripherally attached, and which is itself attached to rails inside the vehicle.

12 Claims, 3 Drawing Sheets

DRAG REDUCTION POLYMER EJECTION SYSTEM FOR UNDERWATER VEHICLE

STATEMENT OF GOVERNMENT INTEREST

The invention described herein may be manufactured and used by and for the government of the United States of America for governmental purposes without the payment of any royalties thereon or therefore.

BACKGROUND OF THE INVENTION (1) Field of the Invention

The present invention relates to ejecting liquid polymers into the boundary layer of the fluid surrounding an underwater vehicle, and deals more specifically with a system for delivering pressurized polymer from a unique reservoir within the vehicle.

(2) Description of the Prior Art

Systems for storing and ejecting polymers into the boundary layer of an underwater vehicle are known. Generally speaking, such systems provide for a rigid storage tank in the vehicle, and suitable internal piping for ejecting liquid polymer into the fluid moving over the vehicle nose portion to provide a more laminar flow of the fluid through which the underwater vehicle is traveling.

One example of a typical prior art system can be found in U.S. Pat. No. 3,286,674 issued to Thompson, et al. In the disclosure of the Thompson, et al. patent, a pump is provided to pressurize sea water drawn through an inlet at the aft end of the vehicle and mixed with the polymer so the mixture is available for ejection at the nose of the vehicle to thereby reduce the tendency of the fluid flow around the vehicle to separate and/or become turbulent, the polymer and sea water mixture providing for a more laminar flow of the fluid mixture along the external surface of the underwater vehicle.

A similar system is disclosed in Hulsebos, et al., U.S. Pat. No. 3,392,693, and also in U.S. Pat. No. 4,186,679 issued to Fabula, et al.

These prior art systems teach the necessity for pressurizing a mixing chamber which is of rigid geometry and therefore occupies a substantial portion of the interior of the vehicle. Further, these prior art systems are not acoustically quiet enough to satisfy current requirements for underwater vehicles of the type used by the United States Navy for example. Air pockets trapped in such prior art systems, where the pressure is rapidly decreasing, create popping sounds that result in undesirable noise that can lead to premature detection of the vehicle in a combat situation.

The present invention also satisfies a need for meeting the requirements for an underwater vehicle in a testing environment where the vehicle is purposely made buoyant and is tested in a vertical ascent situation such that the fluid pressure at some depth is utilized to create the pressure required for ejecting the polymer and thereby reducing its drag as it travels to the surface of the water. In such tests, the buoyant vehicle is pulled downwardly underwater and the water enters a cavity defined within the vehicle, the entrapped air being vented overboard through a suitable vent in the vehicle's hull or shell. Even in such testing scenarios it is important to reduce the popping noises created by any air trapped within the system during ascent of the vehicle from its launch position well below the surface of the water.

SUMMARY OF THE INVENTION

It is a general purpose and object of the present invention to provide an improved system for ejecting liquid polymer from an underwater vehicle, and more particularly to provide a system that operates in an acoustically more quiet mode than is presently possible with prior art systems of the types described in the above-mentioned patents.

It is a further object of the invention to provide a system with a high capacity reservoir that is especially well suited for use in buoyant test vehicles that heretofore have required recharging of the polymer reservoirs contained therein after each launch sequence. Another object is to provide a system that allows for refilling of the reservoir when the vehicle is floating on the water surface in a horizontal position.

These objects are accomplished with the present invention by providing a unique boundary layer fluid reservoir having at least one and preferably two opposed wall portions defined by resiliently flexible bladder material. This unique reservoir is provided in a fluid chamber that is adapted to be filled with the external fluid or sea water, which sea water is pressurized either by pump means or by drawing the vehicle downwardly to a significant depth below the surface of the sea in the testing environment. As a result of the flexible resilient side walls of the boundary layer fluid reservoir, the propensity for entrapping air in the system characteristic of prior art systems is avoided entirely or at least such a possibility is minimized. In addition to eliminating noise associated with expanding air, the lack of entrapped air allows for refilling the reservoir with the vehicle in any position without having to purge air from the system.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
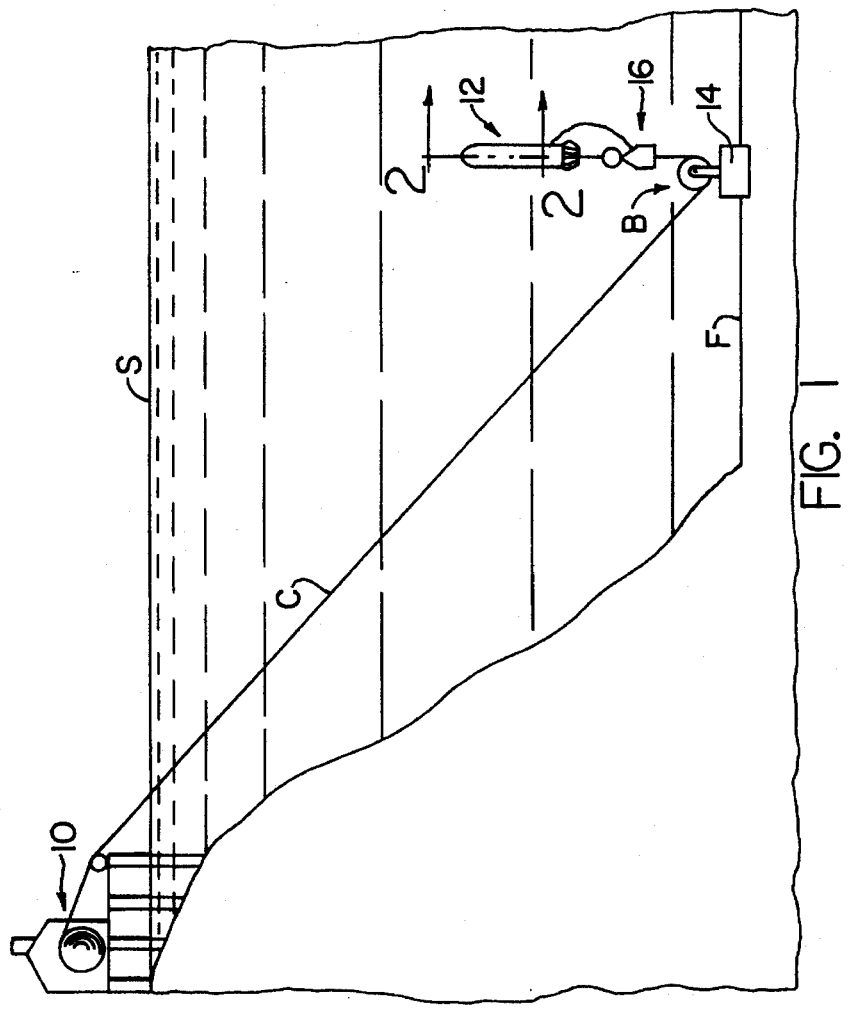
FIG. 1 shows in schematic fashion a buoyant test vehicle fitted with a system in accordance with the present invention, this test vehicle comprising one possible environment for the present invention and being illustrated in its launch position approximately 500 feet below the surface of the water in preparation for launch.

Referring now to the drawings in greater detail, FIG. 1 shows an underwater vehicle 12 which is illustrated in the form of a buoyant test vehicle of the type adapted to be pulled down beneath the surface S of the water to a predetermined depth, approximately 500 feet, in order to provide a suitable environment for testing the vehicle's performance after launch as it rises to the surface S under the influence of known buoyancy forces, and under the influence of drag reducing systems provided in the vehicle for releasing fluid polymers at predetermined locations on the vehicle and under the control of a polymer ejection system in accordance with the present invention.

In a typical buoyant test vehicle environment, a shack 10 is provided on the shoreline as shown in FIG. 1, and a power winch is provided in the shack so that a cable C can be deployed to a block B that is anchored to the sea floor F by conventional anchoring means 14. The buoyant test vehicle 12 is secured to the cable C by a pull down and releasing buoy, as suggested generally at 16. Conventional means is provided for releasing the buoyant test vehicle and the vehicle includes suitable equipment for providing relevant data to a remote location during the travel of the buoyant test vehicle from the launch position shown to the surface S of the sea or water.

Figure 2:
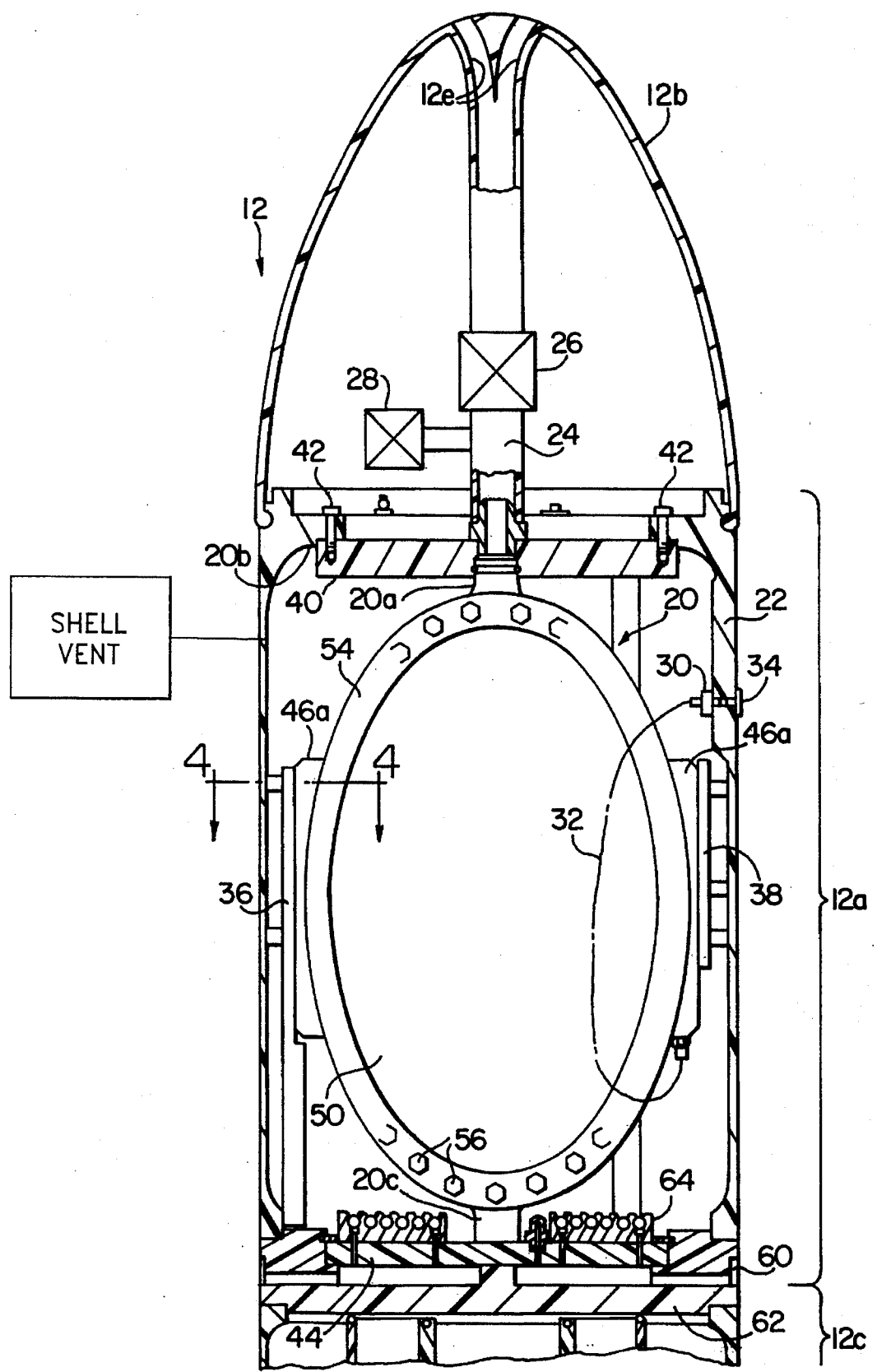
FIG. 2 is a vertical section taken on the line 2—2 of FIG. 1.

FIG. 2 is a vertical section taken on line 2—2 of FIG. 1 showing a cylindrical segment 12a of the buoyant test vehicle 12 which segment is located at the forward end of the vehicle 12. A nose portion of the vehicle is designated at 12b, and a further section 12c, shown partially in FIG. 2, is provided for housing various conventional components, some of which have been referred to in the previous paragraph. It will be apparent that the present invention will be described in the environment of a buoyant test vehicle, but that the invention itself may also be embodied in underwater vehicles generally. Therefore, the present description will concentrate on the configuration of the vehicle forward of the conventional section 12c, so that the latter need not be described in detail herein.

A polymer ejection system in accordance with the present invention as disclosed in FIG. 2 includes a bladder assembly 20, to be described in greater detail below, which bladder assembly 20 is mounted within a generally cylindrical shell 22 that comprises the exterior of the aforementioned vehicle section 12a referred to previously. The bladder assembly 20 defines an internal cavity or boundary layer fluid reservoir which stores the polymer that is to be expelled through delivery tube 24 in the nose portion 12b of the vehicle through suitable ports as shown at 12e defined adjacent the center line or axis of the vehicle nose portion, but possibly defined along the ogive or curved portion of the nose downstream of the nose centerline. A solenoid valve 26 is provided in the delivery tube 24 to control the flow of polymer from these ejection ports 12e. Means is provided for filling the boundary layer fluid reservoir with polymer through this delivery tube 24 and preferably said means includes a fill valve 28 that includes conventional check valve means to allow the flow of fluid only in the proper direction for delivering polymer to the reservoir. Means is provided for venting air from this reservoir during such filling operation and fill vent 30 communicates with the interior of the bladder reservoir by means of a line indicated schematically at 32 for this purpose. The fill vent 30 is secured by a plug, as indicated generally at 34, once the reservoir has been filled with polymer.

The polymer reservoir defining means, in the form of the bladder assembly 20, is mounted in the generally cylindrical cavity or chamber defined by the shell 22. More particularly, the bladder assembly is mounted on rails 36, 38 arranged in diametrically opposed relationship within this cylindrical shell 22 for this purpose. The bladder assembly is also connected to the vehicle structure at the outlet port 20a of the reservoir or bladder assembly which is provided in a structural bulkhead or plate as indicated generally at 40 in FIG. 2. This plate 40 is secured to the cylindrical shell 22 and more particularly to an annular ring 20b which is provided at the forward end of the shell 20 by suitable fasteners as indicated generally at 42 in FIG. 2. Finally, the bladder assembly 20 is also secured to an aft bulkhead or plate 44 provided at the aft end of the shell 22 as shown in FIG. 2.

Figure 3:
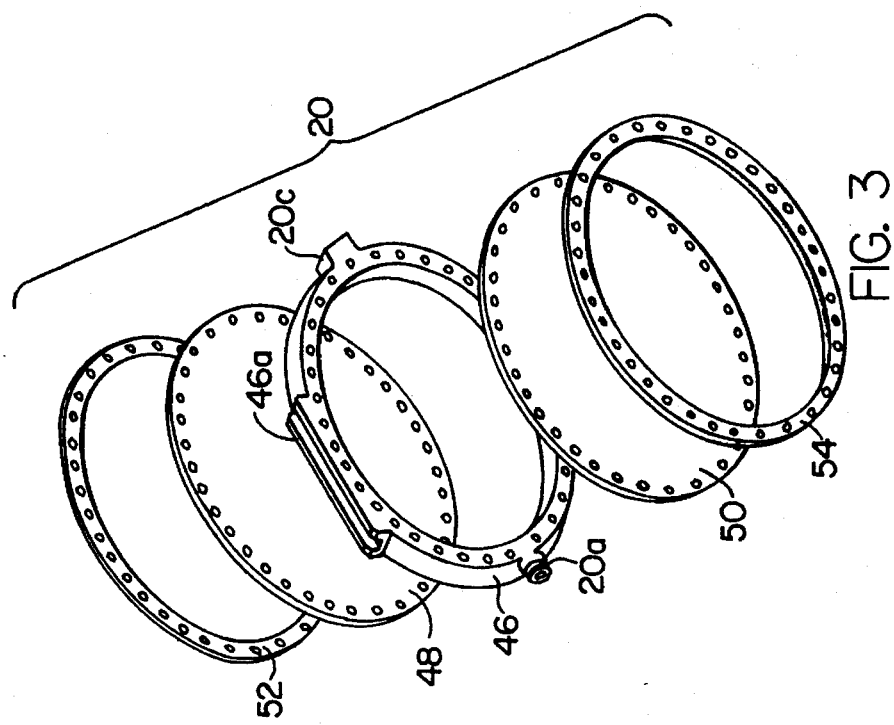
FIG. 3 is an exploded view illustrating the various components of a liquid polymer ejection system reservoir constructed in accordance with the present invention.

Turning now to a more detailed description of the bladder assembly 20, FIG. 3 shows the essential components thereof in exploded relationship. A bladder separator 46 is shown defining the bladder outlet port 20a and also defining a projection 20c that is used to secure the end opposite the port 20a to the aft bulkhead 44 of the shell as described previously. The bladder separator 46 defines diametrically opposed lands 46a which are used to support the reservoir in the cylindrical shell on the rails 36, 38 referred to previously. The bladder separator 46 is of generally elliptical configuration and defines at least a portion of the polymer reservoir in accordance with the present invention. However, the reservoir is also defined by two bladder elements 48, 50 which are secured to the elliptical ring shaped bladder separator 46 by suitable fasteners arranged peripherally around the bladder separator. Elliptical washer rings 52, 54 serve to clamp the bladder elements to the separator 46.

Figure 4:
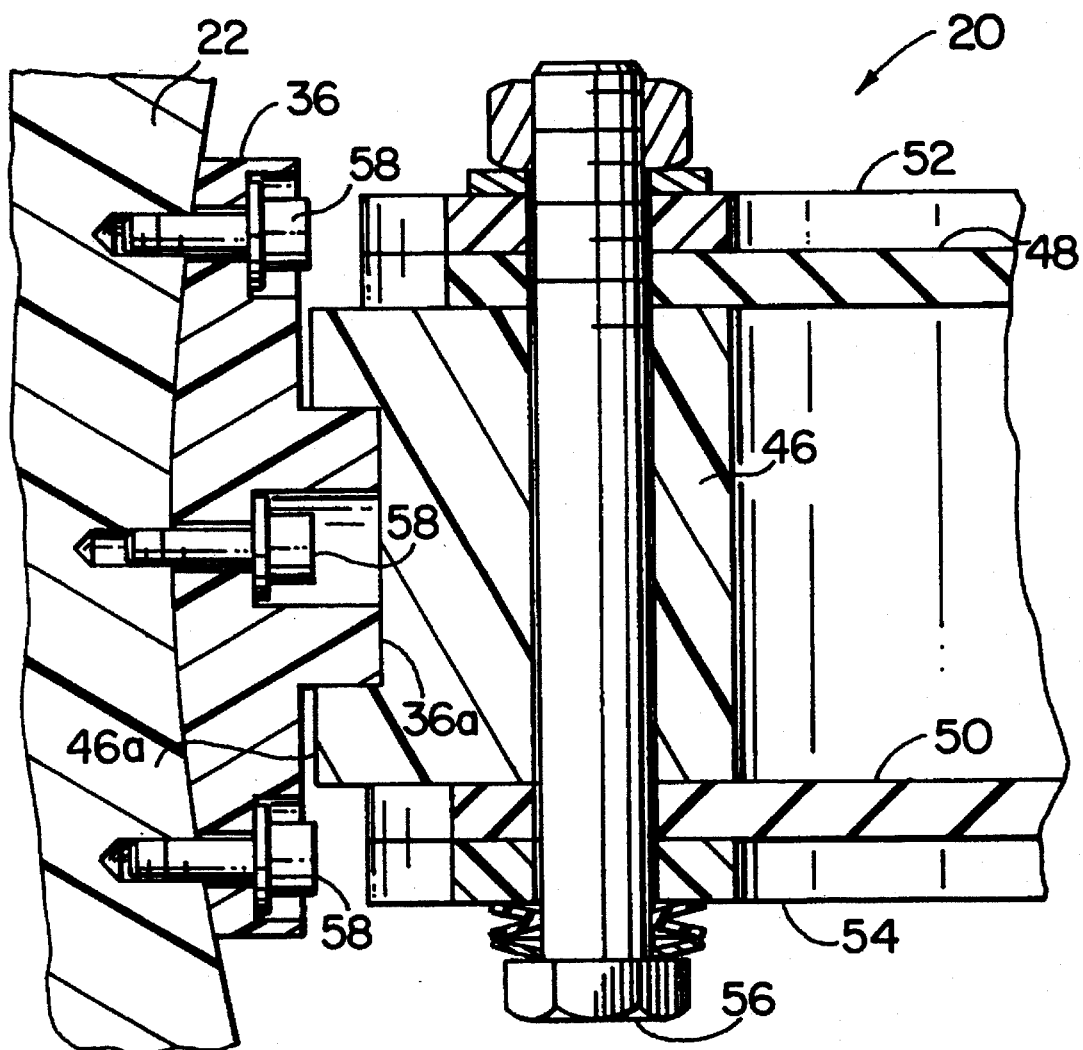
FIG. 4 is a sectional view taken on the line 4—4 of FIG. 2.

Referring now to the sectional view taken on line 4—4 of FIG. 2, FIG. 4 shows bladder elements 48, 50 secured to the bladder separator 46 by fasteners shown generally at 56. Each fastener comprises a through screw and the bladder elements are protected by the elliptical washers 52, 54 discussed previously. FIG. 4 shows one of the rails 36 provided on the inside wall of the cylindrical shell 22 and illustrates the channel shape provided on these rails 36, 38 as well as the manner in which the bladder separator 46 is supported on rail 36. Each rail includes a raised portion 36a that mates with a groove provided for this purpose in the land 46a of the separator 46. Rails 36, 38 are in turn secured to the shell by fasteners indicated generally at 58 in FIG. 4.

Referring once again to FIG. 2, means is provided for pressurizing the interior of the shell 22 so that after the reservoir assembly has been provided with polymer as described previously, suitable pressure is available to eject the polymer from the ejection ports 12e provided in the nose of the vehicle for this purpose. In the buoyant test vehicle disclosed herein, the means for pressurizing this chamber in the shell comprises a water fill annulus 60 defined between bulkhead 44 and a further bulkhead 62. High pressure sea water is available in this fill annulus 60 and can be provided through a flow restrictor 64 to the chamber defined within cylindrical shell 22. Thus, the sea water, at the depth to which the buoyant test vehicle is drawn for launch purposes, provides the necessary force on the outer surface of the bladder elements that is available for driving the polymer from the bladder cavity or reservoir out through the ports in the nose of the buoyant test vehicle.

Turning now to a brief description of the operation of a buoyant test vehicle equipped with a polymer ejection system in accordance with the present invention, the first step is to verify that the solenoid valve 26 is closed, and then to remove the plug 34 from the fill vent 30. The fluid fill valve 28 is then connected to a filler line so that the polymer fluid can be pumped into the bladder assembly reservoir through the check valve associated with this fill valve 28. The fill vent plug 34 would be replaced when all the air in the bladder reservoir had been bled and as the fluid begins to issue from fill vent 30. The polymer would be continually pumped into the bladder assembly until the desired pressure is attained. The check valve will prevent the fluid from leaking out once the fill line is disconnected therefrom.

As the buoyant vehicle is pulled downwardly below the surface of the water, the water enters the cavity between the bladder assembly 20 and the shell 22 via the water fill annulus 60 and the flow restrictor 64. As water enters air is vented overboard through a shell vent located at the highest point in the shell which shell vent may include a one way check valve.

To eject the pressurized polymer from the elliptical bladder reservoir, the solenoid valve 26 is electrically actuated opening the valve and allowing the polymer to flow through the valve and delivery tube 24 through the ejection ports 12e.

The drag reducing polymer ejection system of the present invention has been described with reference to a buoyant test vehicle, but it will be apparent that the advantages of the present invention can also be realized in any underwater vehicle generally. The system is acoustically quiet because air that is trapped in the pockets of a system where the pressure is rapidly decreasing are virtually eliminated by use of the flexible bladder configuration described above. Therefore, undesirable popping noises resulting from such trapped air are either totally eliminated or at least alleviated in a polymer ejection system constructed in accordance with the present invention. During the active portion of the buoyant test vehicle's flight, only the bladder and the surrounding sea water are in motion and these generate minimal noise. All noise generating components, both mechanical and electrical, are eliminated during the vehicle's ascent and actual polymer ejection. The elliptically shaped double bladder design fulfills the volume requirements in the confined envelope of the buoyant test vehicle shell. The expansion of both bladders outwardly toward the vehicle shell combines maximum volume with maintaining the reservoir balanced about the vehicle centerline. This result is important in the environment of a buoyant test vehicle because such a vehicle must maintain its center of gravity on the center line of the vehicle during its essentially free flight to the surface. The bladder design and water fill annulus feature of the buoyant test vehicle compensate for rapidly decreasing pressure experienced in the buoyant vehicle as it runs to the surface thereby eliminating any pressure differential across the bladder due to changes in water depth. This design also allows the bladder to be refilled with the buoyant vehicle itself floating horizontally on the surface S of the water. A quick turn-around of a buoyant test vehicle is therefore made possible even when the polymer fluid has been exhausted.

Obviously, many modifications and variations of the present invention may become apparent in light of the above teachings. For example, the method of attaching the walls of the bladder together or the method of attaching the bladder assembly to the shell can be varied to suit the environment of the vehicle. However, the elliptical bladder design described herein is relatively simple and straightforward to manufacture and maintain. Although advantages might be realized from a single flexible wall polymer reservoir, the double walled reservoir disclosed herein appears to provide an optimum solution to the problem of designing a buoyant test vehicle polymer ejection system with acoustically quiet performance.

What is claimed is:

1. A polymer ejection system for an underwater vehicle having an elongated body portion and a nose portion of dome shaped design and further having boundary layer polymer fluid ejection port means for reducing the drag forces on the vehicle as it travels through a first fluid medium, the system comprising:

means for providing a delivery passageway having one end communicating with said ejection port means;

boundary layer fluid reservoir means communicating with another end of the said passageway, said reservoir means having at least one wall portion defined by a resiliently flexible bladder material and having a second wall portion generally coextensive with said first wall portion;

peripherally extending bladder separator means maintaining said bladder wall portions in spaced relationship to one another;

mounting means for supporting said reservoir means from said bladder separator means; and means defining a fluid chamber within the vehicle, said at least one wall portion provided adjacent thereto whereby pressurizing the fluid in said fluid reservoir relative to the fluid pressure in said chamber causes said one wall portion to deform outwardly towards said chamber and pressurizing said fluid in said chamber relative to said boundary layer fluid in the reservoir causes said one wall portion to deform inwardly away from said chamber.

2. The polymer ejection system according to claim 1, further characterized by valve means for closing said passageway and preventing boundary layer fluid from reaching said ejection port means.

3. The polymer ejection system combination according to claim 2, further characterized by said valve means being selectively operable remotely.

4. The polymer ejection system combination according to claim 2, wherein the source of pressure for filling said fluid chamber comprises bringing said vehicle to a depth in said first fluid medium sufficient to establish the pressure of the surrounding first fluid medium in said fluid chamber.

5. A polymer ejection system for an underwater vehicle having an elongated body portion and a nose portion of dome shaped design and further having boundary layer polymer fluid ejection port means for reducing the drag forces on the vehicle as it travels through a first fluid medium, the system comprising:

means for providing a delivery passageway having one end communicating with said ejection port means;

boundary layer fluid reservoir means communicating with another end of the said passageway, said reservoir means having at least one wall portion defined by a resiliently flexible bladder material and having a second wall portion generally coextensive with said one wall portion;

bladder separator means for maintaining said wall portions in spaced relationship to one another;

means defining a fluid chamber within the vehicle, said at least one wall portion provided adjacent thereto whereby pressurizing the fluid in said fluid reservoir relative to the fluid pressure in said chamber causes said one wall portion to deform outwardly towards said chamber and pressurizing said fluid in said chamber relative to said boundary layer fluid in the reservoir causes said one wall portion to deform inwardly away from said chamber;

support rails fixed to said fluid chamber defining means; and rail fitting portions of said bladder separator means, said fitting portions fitting into said support rails to fix said boundary layer fluid reservoir means inside said chamber with said bladder wall portions spaced from said chamber defining means.

6. The polymer ejection system according to claim 5, further characterized by boundary layer fluid filler means tapped off said passageway to allow filling said reservoir means with said boundary layer fluid.

7. The polymer ejection system combination according to claim 6, wherein selectively closable vent means is provided for use during the filling of the fluid reservoir means.

8. The polymer ejection system according to claim 5, further characterized by vent means for said fluid chamber to permit venting air from said chamber when said vehicle is immersed in said fluid medium.

9. The polymer ejection system combination according to claim 8, wherein said fluid chamber includes means for restricting the flow of such fluid medium during filling so as to eliminate any entrapped air in the system after said filling has been completed.

10. The polymer ejection system combination according to claim 5, further including fastener means for securing said one and said second wall portions to said bladder separator means, and washer means associated with said fastener means.

11. The polymer ejection system combination according to claim 5, wherein said means defining said fluid chamber within the vehicle has a symmetrical center line on the central axis of the vehicle, and wherein said boundary layer fluid reservoir means is generally symmetrical with respect to a plane that includes said center line and said support rails.

12. The polymer ejection system combination according to claim 11, wherein said fluid reservoir means is of generally elliptical configuration.

* * * * *